United States Patent Office 3,522,181
Patented July 28, 1970

3,522,181
ELECTROPHOTOGRAPHIC DEVELOPER
Walter L. Garrett, Freeland, Mich., and Henderson C. Gillespie, Moorestown, and Louis J. Sciambi, Wenonah, N.J., assignors to The Dow Chemical Company, Midland, Mich., a corporation of Delaware
No Drawing. Filed Nov. 7, 1966, Ser. No. 592,336
Int. Cl. G03g 9/00; C23q 1/00
U.S. Cl. 252—62.1                                    7 Claims

ABSTRACT OF THE DISCLOSURE

A liquid electrophotographic developer composition for forming a photo resist in the preparation of printing plates, masters and such contains a cross-linking promoting catalyst, a silicone intermediate resin having one or more reactive hydroxyl groups, a carrier liquid of an aliphatic or aromatic hydrocarbon, and an anionic sulfonate surfactant, and the composition is characterized by an electrical conductivity of from about $0.5 \times 10^{-11}$ to about $1.0 \times 10^{-9}$ reciprocal ohm centimeters.

The foregoing composition is best prepared by ball milling a grinding slurry made up of the cross-linking promoting catalyst, the silicone intermediate resin, the anionic sulfonate surfactant and an appropriate amount of the hydrocarbon liquid to obtain good grinding action. Ball milling is continued for about 20–72 hours after which the slurry is removed from the mill and stored or diluted to a usable concentration.

---

This invention relates to electrophotography and more particularly concerns a new and novel electrically conductive liquid developer composition for use in preparing printing plates and masters, and a method of preparing said composition.

One method of electrophotographically preparing printing plates comprises, for example, first establishing a thin photoconductive coating on an etchable plate of photoengraving grade magnesium or zinc base metal. The photoconductive composition may comprise, for instance, a mixture of a photoconductive zinc oxide suspended as a fine dispersion of particles in a cross-linking, film forming, resinous insulating binder. Suitable resinous binders include, for example, silicone intermediate resins and certain epoxy resins. The plate so-coated is then negatively electrostatically charged by corona discharge means and exposed to an illuminated image desired to be reproduced, either by contact or projection techniques, thereby to form a latent electrostatic image or pattern on the plate. The images to be reproduced commonly include design work, lines, letters, and photographs. In the case of photographs, the image must first be "screened" in order to break up the image into so-called halftone dots before the charged plate is exposed thereto.

The latent image is subjected to the action of a number of subsequent steps to "develop" it to convert it to a visible fixed image which is, e.g., resistant to an acid etching composition or to convert it to an image suitable, e.g., for use in lithographic printing masters. These subsequent steps may comprise, for example, contacting the electrostatic image with cross-linking promoting catalyst particles of aluminum octanoate, in an inert hydrocarbon carrier liquid, said particles being positively charged. So-contacted, the plate is rinsed as free of catalyst particles as possible in an inert rinse liquid, dried, then exposed to an elevated temperature to promote cross-linking (or curing) of the resin binder to form a "photo resist" in the image areas. The non-image areas, not having been deposited by catalyst, are then removed with a suitable solvent and scrubbing. Any chromate conversion coatings in the non-image areas are removed such as by an acid wash. The plate now exhibiting a visible image is ready for etching, preferably by the powderless etching process disclosed and claimed in U.S. Letters Patent 2,828,194 or 3,152,083. The plate may also be powder-etched.

An object of the present invention is to provide a novel developer composition for use in electrophotographically preparing fixed images on a substrate.

Another object of the invention is to provide an effective and improved electroconductive liquid developer composition for use in developing electrophotographic plates.

Another object is to provide a time stable, electrically conductive, liquid developer for use in developing latent electrostatic images.

A further object of the invention is to provide a time stable conductive liquid developer for use in processing electrophotographic plates to produce etchant resist image patterns thereon, and a method of preparing said liquid developer.

A still further object of the invention is to provide a stable developer composition which is characterized as having an electrical conductivity in solution, a high flash point and low toxicity, a high capacity, and which will not congeal upon standing for extended periods, the images developed being of high quality.

In general, the invention comprises a novel developer composition wherein the above objects and advantages have been found, comprising by addition, (a) a cross-linking promoting catalyst, (b) a silicone intermediate resin, (c) a carrier liquid of an aliphatic or aromatic hydrocarbon, including mixtures thereof, (d) an anionic sulfonate surfactant, and, as an optional additional ingredient, (e) an insoluble solid pigment material, the developer composition being characterized by an electrical conductivity of from about $0.5 \times 10^{-11}$ to about $1 \times 10^{-9}$ reciprocal ohm centimeters.

Liquid developer compositions heretofore known and disclosed were electrically insulating in purpose and selected for their deliberately low electrical conductivity. The carrier liquids in these conventional compositions were of high electrical resistivity as disclosed, e.g., in Reproduction Methods, October 1964, page 44 wherein it is stated that "The liquid phase is invariably an organic compound of high electrical resistivity . . . a minimum of about $10^{+9}$ ohms-cms. in value."

(a) CROSS-LINKING PROMOTING MATERIAL COMPONENT

The cross-linking promoting material or catalyst component of the developer composition of the present invention is employed in an amount within the operable range of from about 35 to about 50 percent by weight, based on the total weight of all solid components added, and preferably from about 40 to about 45 percent. Examples of suitable catalyst materials are those which promote or aid cross-linking of resins used in electrophotographic coatings, such as, for example, intermediate silicone, epoxy or polyvinylbutyral resins, or mixtures thereof, as binders in the aforesaid photoconductive coatings. Examples of catalysts include alkoxy aluminum fatty acid salts and hydroxy ether aluminum fatty acid salts.

The alkoxy catalyst salts comprise in general a group of dialkoxy aluminum fatty acid salts, i.e., dialkoxy-acyloxy-aluminum compounds, wherein each alkoxy group of any particular salt within said group contains from 1 to about 10 carbon atoms, inclusive, and the fatty acid or acyloxy radicals thereof contain from about 6 to about 18 carbon atoms, inclusive. Of these alkoxy salts, dimethoxy aluminum octanoate and diethoxy aluminum octanoate are preferred. In general, these alkoxy aluminum fatty acid salts may be prepared by reacting a primary alcohol with an aluminum fatty acid salt under alkaline conditions, said alcohol having from 1 to about 10 carbon atoms, inclusive, and the fatty acid radical of said aluminum salt having from about 6 to 18 carbon atoms, inclusive, at a temperature of from about 20° to about 250° C., and separating the solid alkoxy aluminum fatty acid salt so-formed from the liquid phase of the reaction mass.

The hydroxy ether catalyst salts, i.e., alkoxyalkyleneoxy-acyloxy-hydroxy-aluminum compounds, comprise in general a group of said salts corresponding to the formula:

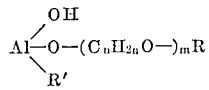

wherein R' represents a fatty acid or acyloxy radical containing from 6 to 12, inclusive, carbon atoms, $n$ represents an integer of from 2 to 3, inclusive, $m$ represents an integer of from 1 to 3, inclusive, and R represents an alkyl radical containing from 1 to 4 carbon atoms, inclusive. Of these hydroxy ether salts aluminum ethoxyethyl ether octanoate and aluminum ethoxy methyl ether octanoate are preferred. In general, these hydroxy ether salts may be prepared by reacting a primary straight chained glycol ether with an aluminum fatty acid salt under alkaline conditions, the fatty acid radical of said aluminum fatty acid salt having from 6 to 12 carbon atoms, inclusive, at a temperature within the range of from about 20° C. to about 250° C. for at least 15 minutes, and then separating the solid hydroxy ether aluminum fatty acid salt from the liquid phase of the reaction mass.

(b) RESIN COMPONENT

The silicone intermediate resin component of the present inventive developer composition may be of both straight chained in structure, such as, for example, SR-82 silicone resin made by the General Electric Company, or, cyclic in structure, such as, for example, Z6018 made by the Dow Corning Corporation, provided the selected resin contains one or more reactive hydroxyl groups. SR-82 silicone resin, as indicated in the General Electric Co. products bulletin "Silicones Product Data," Revision A, superseding the issue of Aug. 15, 1955, is further characterized (1) as a hard silicone resin suggested primarily as a blending resin compatible with many organic resins, and (2) as a silicone polymer with OH groups thereon for polymerizing further. The resin is supplied as a straw colored xylol solution with about 60% solids content, a specific gravity of about 1.06 at 25° C., a viscosity in the range of 5 to 30 centipoises at 25° C., and with no catalyst present. Z-6018 intermediate, according to the Dow Corning bulletin 03–013, dated September 1964, and entitled "Information About Silicone Protective Coating Resins," is a hydroxy-functional (5.5% condensible hydroxyl content), low molecular weight (ave. 1600), silicone intermediate which will react with a wide variety of organic protective coating resins and monomers. The intermediate has a refractive index of 1.531 to 1.539. A xylene solution containing 60% by weight of this intermediate is clear, has a specific gravity of 1.075 at 77° F., and exhibits a viscosity of 33 centipoises at 77° F. The resin is employed in an amount by addition within the operable range of from about 1 to about 20 weight percent, and preferably in an amount of from about 10 to about 15 percent, based on the weight of total solids added in the developer composition. In a dilute working bath composition for developing electrophotographic plates the resin will be present in an amount of from about 0.05 to about 1.2 grams per liter of bath.

(c) ANIONIC SURFACTANT COMPONENT

The anionic sulfonate surfactant component of the present invention serves to provide, with the other components, the necessary electrical conductivity characteristics of the developer composition. It is employed in an amount of from about 1.0 to about 30 weight percent of the weight of the solid components used and preferably within the range of from about 10 to about 15 percent.

The anionic sulfonate surfactants for use in said composition include, for example, (1) sodium lignosulfonates, (2) sodium alkylnaphthalene sulfonates, (3) oil soluble sulfonates, (4) sulfonated oils, and (5) other sulfonic acid derivatives such as particular substituted halogenated diaryloxide sulfonates.

The sodium lignosulfonates which may be used in the present novel composition comprise polymers built up from monomers of substituted phenyl propane molecules. They include, for example, sodium lignosulfonates whose molecular weights vary between 1,000 to 20,000 known by the trademark of "Marasperse" (trade name) dispersants manufactured from the higher molecular weight fractions and sold by the Marathon Co. Examples of such sodium lignosulfonates are "Marasperse" N, CB and C which are powders characterized by the following properties:

| Property | C | CB | N |
| --- | --- | --- | --- |
| pH—3% solution | 7.0–8.0 | 8.5–9.0 | 7.0–7.5 |
| Total sulfur as S, percent | 5.80 | 1.70 | 6.50 |
| Sulfate sulfur as S, percent | 0.30 | Trace | 1.50 |
| Sulfite sulfur as S, percent | 0.35 | ---- | 0.10 |
| CaO, percent | 3.75 | 0.20 | 0.40 |
| MgO, percent | 1.00 | 0.02 | 0.50 |
| Na₂O₂, percent | 4.90 | 10.00 | 11.00 |
| P₂O₃, percent | 0.30 | Trace | 0.25 |
| OCH₃, percent | 12.00 | 12.64 | 10.60 |
| Solubility in oils and most organic solvents, percent | 0.0 | 0.0 | 0.0 |
| Solubility in water | (¹) | (¹) | (¹) |

¹ In all proportions.

Of the Marasperse dispersants, Marasperse N and CB are preferred.

The sodium alkylnaphthalene sulfonates which may be used as the surfactant component in the present composition are alkyl sodium salt derivatives of sulfonated naphthenic acid. An example thereof is an anionic sodium alkylnaphthalene sulfonate powder designated as "Nekal" (BX–78 trademark of the Antara Chemicals Division) characterized by a density of from about 0.55 to 0.70, and a sodium sulfate content of approximately 20 percent. "Nekal" BA–75, an anionic powder sodium alkylnaphthalene sulfonate characterized by a density of 0.73 and being 65 percent active may also be employed. Other surfactant sodium alkylnaphthalene sulfonates may also be used.

Oil soluble sulfonates may, in addition to those surfactants described above, also may be used in the present composition. Such oil soluble sulfonates include, for example, both anionic and nonionic blends of oil soluble sulfonates with polyoxyethylene ethers, one oil soluble sulfonate of which is designated by the manufacturer as "Emcol" H–52 (trademark of the Witco Chemical Co.). Other oil soluble sulfonates may be employed in the present composition.

Sulfonated oils such as, for example, "Santomerse" 85 (trademark of the Monsanto Chemical Co.) which is in part at least dodecylbenzene sodium sulfonate, may be employed as the surfactant component in the present novel developer composition of the invention. Other sodium alkylbenzene sodium sulfonates may also be used.

A further group of surfactants which may be employed in the present composition are sulfonic acid derivatives such as, for example, oil soluble amine salts of dodecylbenzene sulfonic acid such as "Emcol" P10–59 (trademark of the Witco Chemical Co.), an oil soluble alkyl aryl sulfonate. Other sulfonic acid derivatives may also be employed.

A particularly suitable surfactant, and one which is preferred is a compound, or blend of compounds, of a substituted halogenated diaryloxide sulfonate characterized by the formula

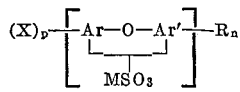

wherein the enclosed molecular nucleus represents a diaryloxide in which Ar and Ar' are selected from a group consisting of phenyls and naphthyls, to which nucleus is appended from 1 to 3 sulfonic groups, X is a halogen, $p$ is an integer from 1 to 3. R is a hydrophobic substituent containing up to 30 carbon atoms, $n$ is an integer from 1 to 8 with a limitation being that the total carbon atoms of the entire compound does not exceed 50 and M is hydrogen or a hydrogen displaceable ion.

A particularly preferred example of a substituted halogenated diaryloxide sulfonate may be characterized by the formula

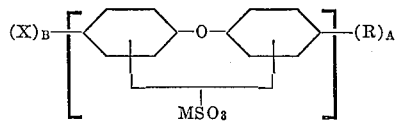

wherein R is an alkyl containing from 1 to 30 carbon atoms, A is an integer from 1 to 8, a limitation being that the total carbon atoms of all substituted alkyls is no less than 4 and does not exceed 30, X is a halogen and B is an integer from 1 to 2. It is to be understood from the foregoing that there is always at least one alkyl substituent and when more than one, the alkyl substituents may contain the same or different numbers of carbon atoms. The preferred form of the foregoing compound contains one sulfonic radical but more than one sulfonic radical may be present in a compound so long as such a compound is a minor proportion of the agent. This preferred form will be referred to hereinafter as diphenyloxide mixture. It comprises primary monodichlorododecyldiphenyloxide sodium sulfonate.

Preferably about 5 to 25 weight percent of the substituted halogenated diaryloxide sulfonate material based on the total weight of solid components is employed in the present developer composition. Moreover, in actual practice the diphenyloxide mixture is added to the mill ingredients for the grinding operation (as will be discussed hereinafter) as a 50 percent solution by weight in one of carrier liquids such as, for example, Solvesso 150 (defined hereinafter). The diphenyloxide mixture, however, may also be added dry.

(d) CARRIER LIQUID COMPONENT

This component of the bath comprises an aliphatic or aromatic hydrocarbon liquid, including compatible mixtures thereof. Suitable carrier liquids include, for example, pure isoparaffinic hydrocarbons, fluorinated hydrocarbons, aliphatic naphtha solvents, and particular odorless mineral spirits.

Operable total amounts by volume of the hydrocarbon carrier liquid or liquids to use per gram of the total combined weight of the solid component, that is, the catalyst, resin, and pigment, in order to make a developer mix, concentrate, or developer bath, depends upon the diluteness required or desired of the catalyst material in the composition during preparation or use of the present composition. The ratio of carrier liquid-to-solid components in the present novel composition employed in or during (1) preparation of the composition mix, (2) dilution of the prepared mix to a so-called concentrate and, (3) further dilution of the concentrate to form the developer bath will be discussed in detail hereinafter in the discussion concerning preparation of the present composition.

Suitable isoparaffinic hydrocarbon liquids which may be used as the carrier liquid component of the present developer composition include, for example "Isopar G" (preferred), "Isopar E" and "Isopar H" (trademark of the Humble Oil and Refining Co.). These so-called "Isopars" are characterized by the following properties:

| Property | G | E | H |
|---|---|---|---|
| Kauri-Butanol value | 27 | 29 | 27 |
| Flash point, TCC ° F | 104 | ¹45 | 123 |
| Vapor pressure at 100° F | 0.4 | 1.0 | 0.4 |
| Evaporation rate at 100% concentrate, sec | 3180 | 353 | 6120 |
| Boiling range, ° F | 318-350 | 240-286 | 350-371 |

¹ Approximately.

The isoparaffinic hydrocarbons are further characterized by exceptionally high purity levels, and relatively high flash points, either alone or in combination with the other components of the present composition, and thus are very well suited for use in the present invention. Of the "Isopars" mentioned, Isopar G is preferred for use herein.

The fluorinated hydrocarbon liquid which may be used as a carrier liquid herein is a stable fluorinated hydrocarbon corresponding to the formula $CFCl_2CClF_2$ called "Freon TF" (trademark of the E. I. du Pont de Nemours and Co.). Freon TF is a non-flammable liquid having a molecular weight of 187.39, a boiling point of 117.63° F., an evaporation rate of 170 seconds (based on $CCl_4$ being 100), a Kauri-Butanol value of 31, and is characterized by a very low toxicity level. This fluorinated hydrocarbon gives very excellent results when used as a carrier liquid in the present developer.

Aliphatic naphtha solvents known as "Solvesso" (trademark of the Humble Oil & Refining Co.) 140 and Solvesso 150 are also useful as a carrier liquid in the composition of the present invention. These liquids are characterized by the following properties:

| Property | 140 | 150 |
|---|---|---|
| Kauri-Butanol value | 30 | 67-90 |
| Flash point ° F | 147 | 150 |
| Evaporation rate in seconds at 100% concentrate | 3,480 | 6,000 |
| Boiling range ° F | 364-402 | 636-415 |

The high flash point and low toxicity properties of these aliphatic naphtha solvents makes them a good carrier liquid for use in the invention.

Various odorless mineral spirits (aliphatic naphtha hydrocarbons) may also be employed as the carrier liquid of the novel developer composition of the invention. Those which are acceptable for use include odorless mineral spirits having a boiling range of from approximately 340° F. to about 415° F., a flash point of about 110° F. to about 160° F., and a Kauri-Butanol value of from about 21 to about 35.

A particularly preferred species of odorless mineral spirits is one characterized by a boiling point of about 133° F., a flash point of about 133° F., and a Kauri-Butanol value of about 25.

The amount of water in the developer liquid, regardless whether in the preparation of the mix or use thereof after dilution as a developer bath, as will hereinafter be discussed, should be as minimal as possible. In any event the developer liquid should be essentially anhydrous. Further, it should be understood that various impurities may be present in the developer composition, such as, for example, those impurity amounts present in the commercially available materials and especially the liquids.

(e) OPTIONAL ADDITIONAL PIGMENT COMPONENT

With respect to the insoluble solid pigment as an optional additional non-essential component of the present novel composition, an amount within the range of from about 30 to about 50 weight percent of the total weight of the solid components added, i.e., the resin and catalyst, is employed and preferably, from about 35 to about 40 weight percent. Pigments which may be used included, for example, black and red iron oxides, lead phthalocyananine, ultramarine blue, and cyan peacock blue, which is preferred. These pigments during the developing sequence deposit on and are attracted to essentially the same plate areas as the catalyst. They aid in actual development of the image areas, and primarily in rendering same visible.

PREPARATION OF DEVELOPER

In preparing the novel electrically conductive developer composition in accordance with the present invention, a mixture is first prepared as a grinding slurry comprising the catalyst, resin, surfactant, and, when employed, the pigment components together with sufficient carrier liquid to provide a viscosity to the mixture whereby maximum grinding effect is obtained, for example, in a ball mill. A suitable grinding viscosity, e.g., lies within a viscosity range of from about 2500 centistokes to about 11,000 centistokes, preferably from about 5000 to 6000 centistokes. The mixture is ground in said ball mill for a period of from about 20 to about 75 hours, preferably at room temperature, preferably 24 to 48 hours.

The proportions of said ingredients to be employed in the grinding slurry are in the following operable and preferred amounts by weight percent based on the total weight of the ingredients:

| Solid component | Operable amount | Preferred amount |
| --- | --- | --- |
| Catalyst, percent | 35–50 | 40–45 |
| Surfactant, percent | 1–30 | 10–25 |
| Resin, percent | 1–30 | 10–25 |
| Pigment (optional), percent | 30–50 | 35–45 |

While both aliphatic and aromatic hydrocarbon carrier liquids may be employed, preferably, the carrier liquid will contain less than about 50 percent by volume of an aromatic type carrier. Equal blends of aliphatic and aromatic carrier liquids are suitable, however, a preferred ratio to employ in the ball mill is from about 10 to about 15 percent by volume of the aromatic liquid, e.g., xylene, and from about 90 to about 85 percent of an aliphatic liquid such as, e.g., Isopar G.

In general the ratio of solid components-to-carrier liquid, consistent with suitable grinding viscosities, ranges in the order of from about 5 to about 9 grams of solids to 90 cc. of carrier liquid with about 6 grams per 90 cc. being preferred.

Normally in preparing the grinding slurry, the surfactant component, e.g., the diphenyloxide mixture, is first dissolved or dispersed in the aromatic portion of the carrier liquid. The surfactant, however, may be added separately if desired, that is, without first combining it with the carrier liquid.

After grinding for the required time, the grinding slurry is discharged from the mill and diluted to a convenient total volume of, e.g., 300 cc. with additional carrier liquid to provide in effect a developer concentrate. In practice the diluent carrier liquid is used to wash out the mill to obtain all the slurry therefrom possible. The amount of carrier liquid used to dilute the slurry to form said concentrate is not critical and may be any convenient amount depending on the desired catalyst concentration therein. A catalyst concentration in the concentrate of about 10 grams per liter has been found to be convenient. The concentrate so-prepared may either be stored, or, used immediately by diluting same to an operable catalyst concentration in a developer bath of from about 0.005 gram per liter of bath to about 1.0 gram per liter of bath, from 0.05 to 0.25 being preferred. Shelf life of the concentrate is several months, e.g., at least 6 months, and even longer if stored at a temperature below about 40° F.

An example of a preferred grinding slurry in accordance with the present invention is as follows:

| | Grams |
| --- | --- |
| Dimethoxy aluminum octanoate | 3.0 |
| Diphenyloxide mixture | 0.6 |
| Z6018 Dow Corning resin | 0.75 |
| Cyan Peacock Blue | 2.75 |
| | 7.05 |

Plus—
- 78 cc. of Isopar G
- 12 cc. of xylene as carrier liquid.

USE OF DEVELOPER COMPOSITION

When employing the present composition as a bath to develop electrographic plates, the concentrate of the composition, as hereinbefore described, is first diluted with additional carrier liquid, preferably an aliphatic liquid, to provide the proper concentration by weight of catalyst per liter of final bath and the desired level of electrical conductivity. The bath so-formulated is then placed in a developer tank, which may be a tray or preferably a commercially available developer tank which circulates the bath. The plate to be developed is immersed in the tank. The duration of the plate in the developer is normally a matter of seconds, e.g., from about 15 to 45 seconds but can be as long as, e.g., 2–3 minutes, depending on the entire system. From time-to-time, of course, the bath must be replenished as needed with more catalyst.

Among the advantages of the invention are that the developer composition has a high capacity for processing electrophotographic plates, an accelerated and complete image development, controlled deposition of catalyst particles in image areas in a manner to prevent excess and waste of catalyst, and effective control of unwanted deposition of catalyst particles in the non-image areas. In addition, the developer concentrate and bath are time stable and do not congeal upon prolonged standing. The developer of the present invention, moreover, is essentially non-corrosive, substantially non-hazardous, and has a low tolerable toxicity level.

Measurements of electrical conductivity of the developer compositions herein were made using parallel electrodes 2.5 cm. x 4.0 cm. spaced 0.6 cm. apart. The electrodes were placed at a standard depth in 115 ml. of 1.5 percent solution of said developer in a 150 ml. beaker. 500 volts of current were applied and the current was measured in micro-amperes. Isopar G was found to have a conductivity of $0.5 \times 10^{-13}$ reciprocal ohm-cms.

The following examples serve to illustrate the present invention and are not to be construed as limiting the invention thereto.

Example I

A grinding slurry was prepared comprising 41.6 percent of dimethoxy aluminum octanoate as a catalyst, 37.5 percent of Cyan Peacock Blue pigment, 10.5 percent of Z6018 silicone resin as a fluidizer, 10.4 percent of a monochloro dodecyl diphenyloxide sodium sulfonate mixture (diphenyloxide mixture) as the surfactant component, 78 cc. of Isopar G and 12 cc. of xylene. This slurry was charged into a ball mill having a capacity of about 1 quart and milled for about 48 hours, whereupon, the ground slurry was removed therefrom using Isopar G as a wash solution and diluted with the washings to 300 cc. of a developer concentrate. Sufficient concentrate was then diluted with additional carrier liquid (Isopar G) to provide a developer bath containing 0.2 gram of catalyst per liter and having a conductivity of $0.24 \times 10^{-10}$ reciprocal ohm centimeters. This bath was then placed in a Master brand developer-rinse tank and used to develop electrostatic images which had been previously formed on light sensitive photoengraving plates. These light sensitive plates comprised a thin magnesium sheet (photoengraving grade) having a coating thereon of a photoconductive zinc oxide suspended in a cross-linking, film forming, insulating, silicone (SR–82) resin binder. The zinc oxide may also be suspended in epoxy resin as well, having epoxide equivalent weight of from about 475 to about 2000, or in epoxy-silicone blends or prepolymers. The so-coated plate was electrostatically negatively charged with a corona wire, then exposed to an illuminated image, whereupon, an electrostatic latent image was formed in the areas not exposed to light.

The plates upon being immersed in the developer bath and exposed to the catalyst, for example, for about 5 to about 60 seconds, preferably 30 to 60 seconds, was catalyzed in the image areas thereby by deposition of catalyst thereon. The plates were then heated at an elevated temperature of from about 300° to about 600° F. for about 30 to about 5 minutes. Thereafter, the non-hardened, non-image areas were washed out with a solvent.

The etchable plates produced by this sequence were of generally high quality. The solids areas were full and dense. The lines and letters and designs were sharply defined providing good resolution and both the shadow and highlight dots were very clear. Moreover, there were few, if any, pimples in the non-image areas. About 100 plates were developed in this manner with this bath having acceptable quality. The conductivity of the bath after development of said 100 plates was $0.24 \times 10^{-9}$ reciprocal ohm centimeters.

Example I illustrates the excellent photoengraving plates that may be obtained using the novel conductive developer composition of the present invention.

COMPARISON TEST

The electrical conductivity of a similar bath as in Example I but containing no sulfonate surfactant was $0.2 \times 10^{-12}$ reciprocal ohm centimeters, which is substantially insufficient to develop exposed electrophotographic plates.

Example II

A bath was made up and used similarly as in Example I above except that about 0.45 gram of Nekal BX–78 surfactant was used in place of the diphenyloxide mixture. Again excellent plates were obtained but the bath had a lower capacity for developing plates.

Example III

Similarly as in Example I a developer bath was made having the composition as therein set forth except that in place of the diphenyloxide mixture 0.45 grams of Santomerse 85 surfactant was used. Very acceptable photoengraving plates were obtained from use of the bath.

Example IV

A developer bath having about the same composition as in Example I was prepared and used for developing plates except that Freon TF and Solvesso 140 was used as the carrier liquid in proportions ranging from 95 to 70 percent by volume of the Freon TF and 5 to 30 percent by volume of Solvesso 140. The plates obtained were of acceptable quality in all ways with very high quality plates being obtained when using from 20 to 30 percent Solvesso and 80 to 70 percent Freon TF.

Example V

A grinding slurry was prepared similarly as in Example I above except that SR–82 silicone intermediate resin was used (in the same amount) in place of the Z6018 resin. Very good plates were obtained when the composition was ultimately used to prepare a developer solution in which plates were immersed for developing.

Example VI

The procedure and composition preparation of Example I was repeated except that the slurry was mixed in the ball mill for about 72 hours. This slurry when used in a developer bath made therefrom produced acceptable plates. However, the toner concentrate did not have as long shelf life as did Example I bath.

Example VII

Example VI was repeated except that the grinding time was about 20 hours. The resultant plates produced were acceptable for use but exhibited large agglomerates of solid particles which were not conducive to making the highest quality images in so far as sharpness of image is concerned.

Example VIII

In this example lead phthalocyanine pigment was used in place of the Cyan Peacock Blue pigment in the grinding slurry. Acceptable plates were obtained when this slurry was used in a developer bath.

Example IX

Example VIII was repeated except that red iron oxide pigment was used. Acceptable resultant photoengraving plates were obtained.

Example X

As in Example I above a grinding slurry was prepared and used forming a developing bath using odorless mineral spirits having a boiling point of about 133° F. and a Kauri-Butanol value of 25. The balance of ingredients were as in said Example I. Very good plates were obtained from use of the bath. The images were very sharp and the solid areas were full.

Other baths were prepared similarly as in the above example but using other catalyst materials such as, e.g., diethoxy aluminum octanoate, aluminum ethoxyethyl ether octanoate, and aluminum ethoxymethyl ether octanoate. In all cases, acceptable and high quality plates were obtained.

All the developer baths in Examples I through X had electrical conductivities within the range specified hereinbefore.

It is manifest that various modifications can be made in the process of the present invention without departing from the spirit or scope thereof and it is understood that we limit ourselves only as defined by the appended claims.

We claim:

1. A liquid electrophotographic developer composition for forming a photo resist in the preparation of printing plates, masters, and the like, consisting essentially of by weight, based on the total solids present: from about 35 to about 50 percent of a cross-linking promoting catalyst material for cross-linking resins, from about 1 to 30 percent of a silicone intermediate resin having one or more reactive hydroxyl groups, a carrier liquid of an aliphatic or aromatic hydrocarbon, and from about 1 to 30 percent of a substituted halogenated diaryloxide sulfonate characterized by the formula

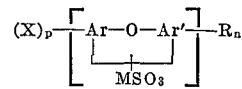

wherein the bracketed molecular nucleus is a diaryloxide radical in which Ar and Ar′ are each selected from the group consisting of phenyl and naphthyl, to which nucleus is appended from 1 to 3 sulfonic groups in which M is hydrogen or a hydrogen replaceable ion, X is a halogen, $p$ is an integer from 1 to 3, R is a hydrophobic substituent containing up to 30 carbon atoms, $n$ is an integer from 1 to 8, the total number of carbon atoms in the entire compound not exceeding 50, the developer composition having an electrical conductivity of from about $0.5 \times 10^{-11}$ to about $1.0 \times 10^{-9}$ reciprocal ohm centimeters and the cross-linking promoting catalyst being a compound selected from the group consisting of (1) dialkoxy-acyloxy-aluminum wherein each alkoxy group contains from about 1 to 10 carbon atoms and acyloxy contains from about 6 to 18 carbon atoms, (2) alkoxy-alkyleneoxy-acyloxy-hydroxy aluminum wherein alkoxy contains from 1 to 4 carbon atoms, alkyleneoxy contains from 1 to 3 repeating units of 2 to 3 carbons each, and acyloxy contains from 6 to 12 carbon atoms, and (3) mixtures of such aluminum compounds, said total solids including catalyst, resin and sulfonate.

2. The developer composition of claim 1 including, as an additional component, an insoluble solid pigment material.

3. The liquid developer composition of claim 1 wherein the substituted halogenated diaryloxide sulfonate is monochloro dodecyl diphenyloxide sodium sulfonate.

4. A dilute liquid developer composition for developing electrophotographic plates in the preparation of printing plates, masters, and the like, which consists essentially of: a cross-linking promoting catalyst material for cross-linking resins in an amount to provide a concentration of from 0.005 to about 1.0 gram per liter of liquid developer, from about 10 to 25 percent by weight, based on total solids, of a silicone intermediate resin having one or more reactive hydroxyl groups, from about 10 to 25 percent by weight, based on total solids, of a substituted halogenated diaryloxide sulfonate characterized by the formula

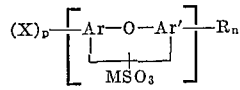

wherein the bracketed molecular nucleus is a dairyloxide radical in which Ar and Ar' are each selected from the group consisting of phenyl and naphthyl, to which nucleus is appended from 1 to 3 sulfonic groups in which M is hydrogen or a hydrogen replaceable ion, X is a halogen, $p$ is an integer from 1 to 3, R is a hydrophobic substituent containing up to 30 carbon atoms, $n$ is an integer from 1 to 8, the total number of carbon atoms in the entire compound not exceeding 50, and a carrier liquid in an amount to suspend and dilute the catalyst to said concentration of catalyst, said developer composition being characterized by an electrical conductivity of from about $0.5 \times 10^{-11}$ to about $1.0 \times 10^{-9}$ reciprocal ohm centimeters and the promoting catalyst being a material selected from the group consisting of (1) dialkoxy-acyloxy-aluminum wherein each alkoxy group contains from about 1 to 10 carbon atoms and acyloxy contains about 6 to 18 carbon atoms, (2) alkoxy-alkyleneoxy-acyloxy-hydroxy aluminum wherein alkoxy contains from 1 to 4 carbon atoms and alkyleneoxy contains from 1 to 3 repeating units of 2 to 3 carbons each, and acyloxy contains from 6 to 12 carbon atoms, and (3) mixtures of such aluminum compounds, said total solids including catalyst, resin and sulfonate.

5. A method for preparing an electrically conductive liquid developer composition having a conductivity of from about $0.5 \times 10^{-11}$ to about $1.0 \times 10^{-9}$ reciprocal ohm centimeters for use in the preparation of printing plates, masters, and the like, which consists essentially of the combination of steps of: ball milling a grinding slurry comprising from about 35 to 50 percent by weight based on total solids of a cross-linking promoting catalyst for resins, from about 1 to 30 percent by weight, based on total solids, of a silicone intermediate resin having one or more reactive hydroxyl groups, and from about 1 to 30 percent by weight, based on total solids, of a sulfonate anionic surfactant in a sufficient amount of a carrier liquid of an aliphatic or aromatic hydrocarbon liquid to obtain a maximum grinding effect, said milling being continued for a period of from about 20 to about 72 hours; discharging said grinding slurry from said mill, and diluting the slurry so ground to the desired concentration of catalyst per liter of composition and the promoting catalyst being a material selected from the group consisting of (1) dialkoxy-acyloxy-aluminum wherein each alkoxy group contains from about 1 to 10 carbon atoms and acyloxy contains from about 6 to 18 carbon atoms, (2) alkoxyalkyleneoxy-acyloxy-hydroxy aluminum wherein alkoxy contains from 1 to 4 carbon atoms and alkyleneoxy contains from 1 to 3 repeating units of 2 to 3 carbons each, and acyloxy contains from 6 to 12 carbon atoms, and (3) mixtures of such aluminum compounds, said total solids including catalyst, resin and sulfonate.

6. The method of claim 5, wherein the grinding slurry includes an insoluble solid pigment material.

7. The method of claim 5 wherein the substituted halogenated diaryloxide sulfonate is monochloro dodecyl diphenyloxide sodium sulfonate.

References Cited

UNITED STATES PATENTS

| 2,907,674 | 10/1968 | Metcalfe et al. | 252—62.1 |
| 2,564,926 | 8/1951 | Rapier | 252—161 |
| 3,110,683 | 11/1962 | Steinhauer et al. | 252—161 XR |
| 3,150,976 | 9/1964 | Johnson | 252—62.1 XR |
| 3,241,998 | 3/1966 | Oliphant | 252—62.1 XR |
| 3,247,148 | 3/1966 | Ellis | 252—500 XR |
| 3,291,138 | 12/1966 | Sciumbi. | |

OTHER REFERENCES

Meals et al.: "Silicones," Reinhold Publishing Corp., N.Y., page 174 (1959).

JOHN DAVID WELSH, Primary Examiner

U.S. Cl. X.R.

117—37; 156—13, 14; 252—500; 260—33.6